(12) United States Patent
Takahashi et al.

(10) Patent No.: US 8,028,589 B2
(45) Date of Patent: Oct. 4, 2011

(54) SENSOR-EQUIPPED BEARING FOR WHEEL

(75) Inventors: Toru Takahashi, Iwata (JP); Kentarou Nishikawa, Iwata (JP); Takayuki Norimatsu, Iwata (JP); Yujiro Ono, Iwata (JP)

(73) Assignee: NTN Corporation, Osaka (JP)

( * ) Notice: Subject to any disclaimer, the term of this patent is extended or adjusted under 35 U.S.C. 154(b) by 69 days.

(21) Appl. No.: 12/448,976

(22) PCT Filed: Jan. 15, 2008

(86) PCT No.: PCT/JP2008/000025
§ 371 (c)(1),
(2), (4) Date: Jul. 17, 2009

(87) PCT Pub. No.: WO2008/087858
PCT Pub. Date: Jul. 24, 2008

(65) Prior Publication Data
US 2009/0301222 A1    Dec. 10, 2009

(30) Foreign Application Priority Data

Jan. 17, 2007    (JP) .................................. 2007-008356
Jan. 17, 2007    (JP) .................................. 2007-008357

(51) Int. Cl.
*G01L 3/14*    (2006.01)
(52) U.S. Cl. ................................. 73/862.322
(58) Field of Classification Search .............. 73/862.322
See application file for complete search history.

(56) References Cited

U.S. PATENT DOCUMENTS

| | | | |
|---|---|---|---|
| 5,488,871 A * | 2/1996 | Harbottle et al. | 73/862.55 |
| 6,694,816 B2 * | 2/2004 | Matsuoka | 73/593 |
| 7,336,067 B2 * | 2/2008 | Inoue et al. | 324/174 |
| 7,547,145 B2 * | 6/2009 | Yamamoto | 384/448 |
| 7,604,413 B2 * | 10/2009 | Koike et al. | 384/448 |
| 2005/0016296 A1 | 1/2005 | Inoue | |
| 2009/0199600 A1 | 8/2009 | Hashimoto | |

FOREIGN PATENT DOCUMENTS

| | | |
|---|---|---|
| EP | 2 006 652 A2 | 12/2008 |
| JP | 2003-530565 | 10/2003 |
| JP | 2003-336653 | 11/2003 |
| JP | 2004-155261 | 6/2004 |
| JP | 2006-077807 | 3/2006 |
| JP | 2006-258241 | 9/2006 |
| WO | 01/77634 A2 | 10/2001 |

OTHER PUBLICATIONS

U.S. Appl. No. 11/886,637, filed Sep. 18, 2007, Ozaki et al., NTN Corporation. International Search Report for PCT/JP2008/000025, mailed Apr. 8, 2008.
English Translation of the International Preliminary Report on Patentability mailed Jul. 30, 2009 and issued in corresponding International Patent Application PCT/JP2008/000025.
European Search Report dated May 11, 2011 in corresponding European Patent Application 08702766.0.

* cited by examiner

*Primary Examiner* — Lisa Caputo
*Assistant Examiner* — Octavia Davis

(57) ABSTRACT

There is provided a sensor equipped wheel support bearing assembly with rolling elements interposed between outer and inner members and with a strain sensor fixed to a stationary member served by one of the outer and inner members. The strain sensor includes a strain generating member and a sensor element secured thereto. The strain generating member has first and second contact fixing segments respectively associated with a flanged face provided in the outer member and a peripheral surface of the stationary member. These contact fixing segments have a joint region therebetween having a bent portion convexed toward the outer member. A location in the strain generating member where the sensor element is secured is on the first contact fixing segment side of the bent portion and yet in the vicinity of the bent portion.

9 Claims, 14 Drawing Sheets

Fig. 13A
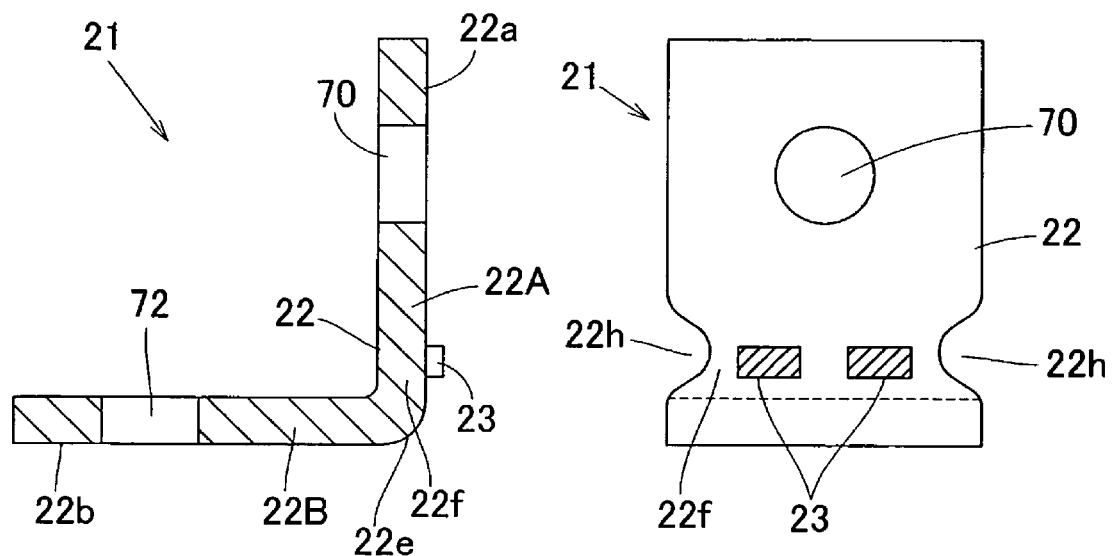
Fig. 13B
Fig. 13C
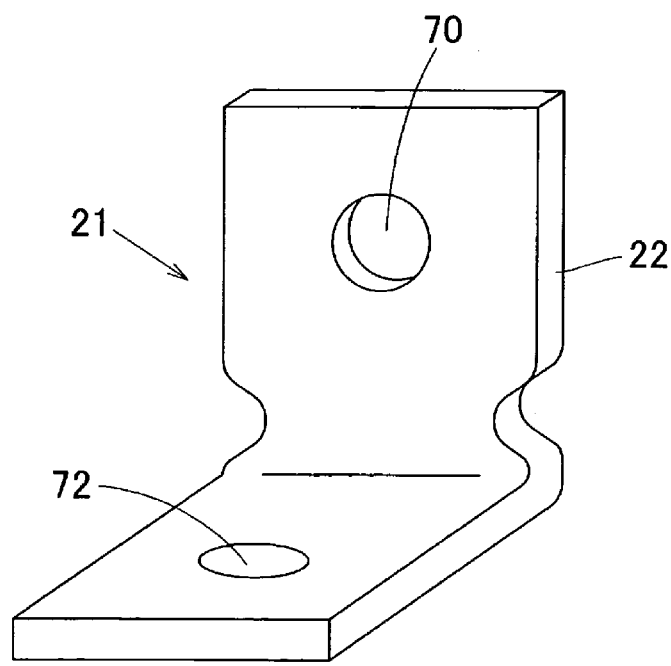

SENSOR-EQUIPPED BEARING FOR WHEEL

CROSS-REFERENCE RELATED TO APPLICATIONS

This application claims the benefit under 35 U.S.C. Section 371, of PCT International Application number PCT/JP2008/000025, filed Jan. 15, 2008 and Japanese Patent Applications No. 2007-008356 and No. 2007-008357, both filed Jan. 17, 2007, the contents of which are incorporated by reference in their entirety into this application.

BACKGROUND OF THE INVENTION

1. Field of the Invention

The present invention relates to a sensor equipped wheel support bearing assembly having a load sensor built therein for detecting a load that acts on a bearing unit rotatably supporting a vehicle wheel.

2. Description of the Prior Art

For safety travel of an automotive vehicle, a wheel support bearing assembly equipped with a sensor for detecting the rotational speed of each of vehicle wheels has hitherto been well known in the art. While the automobile traveling safety precaution is generally taken by detecting the rotational speed of the respective vehicle wheel in various locations, it is not sufficient with only the rotational speed of the vehicle wheel and, therefore, it is desired to achieve a control with the use of other sensor signals for safety purpose.

In view of the above, it may be contemplated to achieve the vehicle stability control based on a load acting on each of the vehicle wheels during travel of an automotive vehicle. By way of example, a large load acts on the outside wheels during the cornering, on the wheels on one side during the run along horizontally inclined road surfaces, or on the front wheels during braking, and thus, a varying load acts on the vehicle wheels. Also, even in the case of the uneven live load, the loads acting on the respective wheels tend to become uneven. For this reason, if the loads acting on the wheels can be detected as needed, suspension systems for the vehicle wheels can be controlled beforehand based on results of detection of the loads so that the stability control of the automotive vehicle during the traveling thereof (for example, prevention of a rolling motion during the cornering, prevention of sinking of the front wheels during braking, and prevention of sinking of the vehicle wheels brought about by an uneven distribution of live loads) can be accomplished. However, an appropriate space for installation of the load sensor for detecting the load acting on the respective vehicle wheel can hardly be found and, therefore, the vehicle stability control through the detection of the load is difficult to realize.

Also, in the event in the near future a steer-by-wire is introduced and the system, in which the wheel axle and the steering come not to be coupled mechanically with each other, is increasingly used, transmission of information on the road surface to the steering wheel hold by a driver, by detecting a wheel axis direction load would come to be required.

In order to meet those needs hitherto recognized, a wheel support bearing assembly has been suggested, in which a strain gauge is affixed to an outer ring of the wheel support bearing assembly for the purpose of detecting strains. (See, for example, the Patent Document 1 listed below.)

[Patent Document 1] Japanese Laid-open Patent Publication No. 2003-530565

Since the outer ring of a wheel support bearing assembly is a bearing component part having a rolling surface defined therein and required to have a strength, which bearing component part is manufactured through complex process steps including, for example, a plastic working, a turning process, a heat treatment and a grinding process, there is a problem in that the productivity is low and the cost of manufacture thereof during a mass production tends to become high where a strain gauge is attached to the outer ring such as disclosed in the Patent Document 1 referred to above. Also, it is not easy to detect a strain occurring in the outer ring with high sensitivity and, when a result of such detection is utilized in controlling the vehicle stability of an automotive vehicle then travelling, a problem will arise in association with the accuracy of the control.

In view of the foregoing, attempts have been made to secure a strain generating member to an outer member and then to fit a sensor element for the measurement of strains to such strain generating member. When this construction is employed, it is sufficient to fix the strain generating member with the sensor element fitted thereto, to the outer ring and, therefore, the productivity can be increased. However, detection of the strains occurring in the outer ring with high sensitivity is still not satisfactory.

SUMMARY OF THE INVENTION

An object of the present invention is to provide a sensor equipped wheel support bearing assembly of a type, in which the sensor for the detection of a load can be compactly installed on an automotive vehicle, in which the load acting on a vehicle wheel can be detected with high sensitivity and in which the mass-production cost can be reduced.

A sensor equipped wheel support bearing assembly according to the present invention is for rotatably supporting a vehicle wheel relative to a vehicle body structure and includes an outer member having an inner periphery formed with a plurality of rolling surfaces, an inner member having rolling surfaces formed therein in face-to-face relation with the rolling surfaces in the outer member, a plurality of rows of rolling elements interposed between those opposed rolling surfaces, and a strain sensor unit made up of a strain generating member fixed to one of the outer and inner members, that serves as a stationary member, and a sensor element for measuring a strain secured to the strain generating member; in which the strain generating member includes a first contact fixing segment associated with a flanged face provided in the stationary member, and a second contact fixing segment associated with a peripheral surface of the stationary member and a joint region defined between the first and second contact fixing segments having a bent portion that is bent at an intermediate site thereof and convexed toward the stationary member and in which a location in the strain generating member, where the sensor element is secured, is in the vicinity of the bent portion in the joint region.

When a load acts on the rotating member incident to travel of the automotive vehicle, the stationary member undergoes deformation through the rolling elements, which deformation in turn results in a strain brought about on the strain generating member. The sensor element secured to the strain generating member generates an output in response to the strain occurring in the strain generating member. The strain imposed on the stationary member can be detected from this output. If the relation between the strain and the load is determined beforehand by means of a series of experiments and/or simulations, the load acting on the vehicle wheel can be detected from the output of the strain sensor. Also, the load so detected can be used in vehicle control of the automotive vehicle.

Since the wheel support bearing assembly of the structure described above is so designed that the sensor unit including the strain generating member and the sensor element secured to the strain generating member is fixed to the stationary member, the sensor for the detection of the load can be installed compactly. Also, since the strain generating member is a simple component easy to fit to the stationary member, attaching the sensor element thereto makes the sensor unit excellent in mass-production and allows the cost to be reduced.

Since the strain generating member has two locations each provided with a contact fixing segment that is associated with the stationary member and since of them the first contact fixing segment is associated with a flanged surface provided in the stationary member and the second contact fixing segment is associated with a peripheral surface of the stationary member, respective radial positions of the first and second contact fixing segments are different from each other and, hence, a transmitted and expanded form of the strain in the stationary member occurs readily in the strain generating member. Because of this, the sensor element outputs in response to the strain so transmitted and expanded and, therefore, the strain in the stationary member can be detected with high sensitivity, resulting in increase of the load measuring accuracy.

Also, since the joint region in the strain generating member has a bent portion that is bent at an intermediate portion thereof and convexed toward the stationary member, a substantial amount of strain occurs particularly in the vicinity of the bent portion. Since the sensor element is secured to a location where such strain occurs particularly considerably, the strain in the stationary member can be detected with even higher sensitivity.

The stationary member may be the outer member. In such case, the strain sensor should be secured to an outer peripheral surface of the outer member. Also, in such case, the joint region in the strain generating member can be so structured as to represent an L-shaped configuration made up of an radially oriented radial zone and an axially oriented axial zone.

Since the joint region of the strain generating member is of the L-shaped configuration as hereinbefore described, strain concentration occurs in the vicinity of the bent portion by the effect of deformation of the flange in the outer member and larger strain than that in the outer member shows up. In other words, the strain occurring in the vicinity of the bent portion of the joint region represents a transmitted and expanded form of the strain at the root portion of the flange. Since the sensor element is secured at the location where the strain occurs as a transmitted and expanded form of the strain in the outer member, an output of the sensor according to the expanded form of strain in the outer member can be obtained, and from this output the strain in the outer member can be detected with high sensitivity.

Where the joint region of the strain generating member is of the L-shaped configuration as hereinabove described, the location in the strain generating member to which the sensor element is secured is preferably positioned within three times the wall thickness of the joint region from the bent portion of the joint region towards one of the first and second contact fixing segments.

The reason therefor is that that as shown in the chart of FIG. 6, the magnitude x of the strain occurring in the joint region of the strain generating member is maximum at the position spaced a distance t from the bent portion and it represents a small value which is unsuitable for the strain measurement, if such position is spaced a distance larger than 3t, where t represents the wall thickness of the joint region.

In the present invention, a plurality of the sensor elements may be arranged on the strain generating member in a fashion juxtaposed relative to each other in a circumferential direction.

Where the plural sensor elements are arranged having juxtaposed relative to each other in the circumferential direction, the strain occurring in the stationary member can be detected by using the mean value of respective outputs of those sensor elements and, therefore, the accuracy with which the strain in the stationary member is detected can be increased.

Also, in the present invention, a plurality of sensor elements of a type similar to, and of the same number as the sensor element at the joint region may be secured to one of the contact fixing segments of the strain generating member or to an extension extending from one of the contact fixing segments in a direction counter to the joint region, in which case an amplifying circuit may be provided for amplifying output of the sensor elements at the joint region based on respective outputs of the sensor elements at the joint region and the extension so as to output a new signal.

Each of the contact fixing segments of the strain generating member and the extension defined so as to extend from each of the contact fixing segments of the strain generating member in a direction counter to the joint region are arranged where they will be little affected by the strain in the stationary member. When the sensor elements at one of the contact fixing segments or at the extension, where it will be little affected by the strain induced in the stationary member, and the sensor elements at the joint region where the strain in the stationary member is transmitted and shows up considerably are bridge connected together to form the amplifying circuit, it is possible to provide the new signal, which corresponds to the amplified output of the sensor elements at the joint region. When such amplified signal is used for the detection of the strain in the stationary member, the strain in the stationary member can be detected with high sensitivity.

In the present invention, a peripheral area of that location in the strain generating member where the sensor element is secured may be of a shape having a locally reduced width or having a locally reduced thickness. By so doing, the strain particularly considerably occurs in the peripheral area of the location in the strain generating member where the sensor element is secured. For this reason, the strain in the stationary member can be detected with high sensitivity.

In the present invention, the strain generating member may be made from a press finished product of a plate material.

Where the strain generating member is made by pressing a plate material, manufacture of the strain generating member can be facilitated and the cost can therefore be reduced.

In the present invention, the strain generating member may be made from a machined product.

Where the strain generating member is made by the use of a machining process, it is easy to change the width and/or the wall thickness of the strain generating member and it can be processed to an optimum shape sufficient to allow the strain to occur considerably in the peripheral area of the location where the sensor element or elements are secured.

In the present invention, the strain generating member may be made of a sintered metal by means of a metal powder injection molding technique.

When the strain generating member is made by the use of the metal powder injection molding, the strain generating member having a good dimensional accuracy can be obtained.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 13A is a cut out side sectional view showing the strain sensor of FIG. 12;

FIG. 13B is a rear view thereof;

FIG. 13C is a perspective view thereof;

DESCRIPTION OF THE PREFERRED EMBODIMENTS

Figure 1:
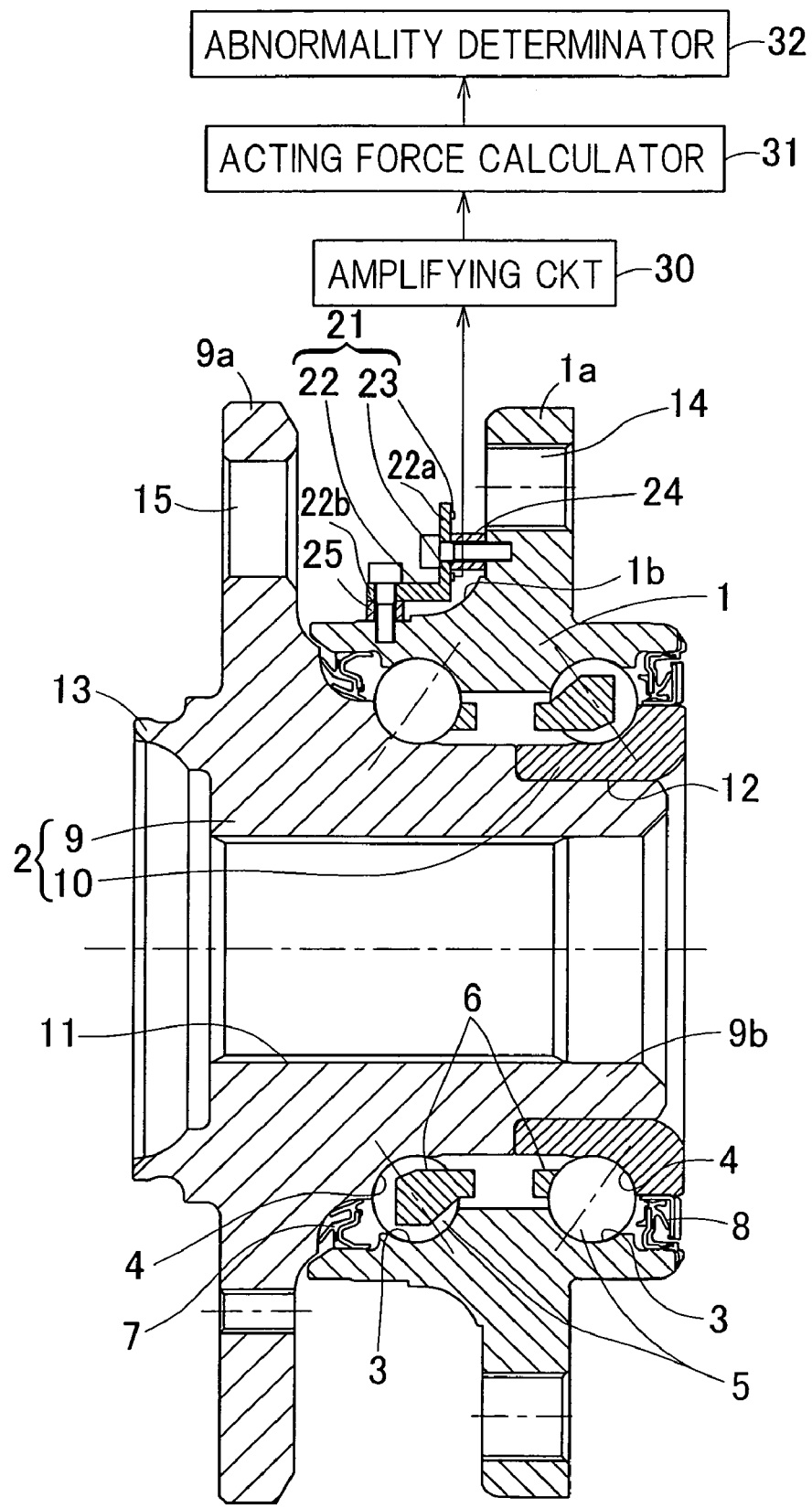
FIG. 1 illustrates a sectional view of a sensor equipped wheel support bearing assembly according to a first preferred embodiment of the present invention, and also a block diagram showing the concept of a detecting system therefor.

A first preferred embodiment of the present invention will now be described in detail with particular reference to FIGS. 1 to 5. This first embodiment is applied to a third generation model of a wheel support bearing assembly of an inner ring rotating type that is used for the support of a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

A sensor equipped wheel support bearing assembly according to this embodiment includes an outer member 1 having its inner periphery formed with a plurality of rolling surfaces 3, an inner member 2 formed with rolling surfaces 4 opposed to the respective rolling surfaces 3, and a plurality of rows of rolling elements 5 interposed between the rolling surfaces 3 of the outer member 1 and the rolling surfaces 4 of the inner member 2. This wheel support bearing assembly is rendered to be a double row angular contact ball bearing type, in which the rolling elements 5 are employed in the form of balls that are rollingly retained by a retainer 6 employed for each row. The rolling surfaces 3 and 4 have arcuately sectioned shapes, respectively, and the rolling surfaces 3 and 4 are so formed as to have a contact angle oriented outwardly. Opposite annular open ends of a bearing space delimited between the outer member 1 and the inner member 2 are sealed by respective sealing devices 7 and 8.

The outer member 1 is the one that serves as a stationary member and is of one-piece construction in its entirety including a flange 1a formed in an outer periphery thereof and adapted to be secured to a knuckle rigid with a vehicle suspension system for the automotive body structure. The flange 1a has a plurality of vehicle body fitting holes 14 defined therein at a corresponding number of circumferential portions thereof.

The inner member 2 is the one that serves as a rotating member and is made up of a hub unit 9 having a hub flange 9a for mounting a vehicle wheel, and an inner ring 10 mounted externally on an inboard end of a hub axle 9b of the hub unit 9. The rolling surfaces 4 referred to previously are formed respectively in the hub unit 9 and the inner ring 10. The inboard end of the hub unit 9 has its outer periphery radially inwardly stepped to define an inner ring mounting area 12 of a reduced diameter, and the inner ring 10 is fixedly mounted on such inner ring mounting area 12. The hub unit 9 has a center bore 11 defined therein so as to extend completely through the length of the hub unit 9. The hub flange 9a has a plurality of press-fitting holes 15 defined in respective circumferential locations thereof for receiving corresponding hub bolts (not shown) that are press-fitted therein. The hub flange 9a of the hub unit 9 has a root portion thereof formed with a cylindrical pilot portion 13 so as to protrude in an outboard direction, which pilot portion 13 serves to guide the vehicle wheel and brake components (not shown).

Figure 4A:
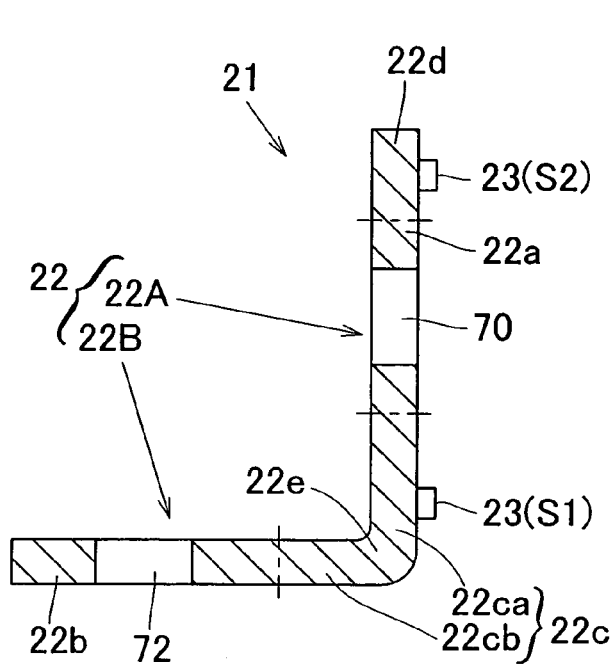
FIG. 4A is a cut-out side sectional view showing the strain sensor.
Figure 4B:
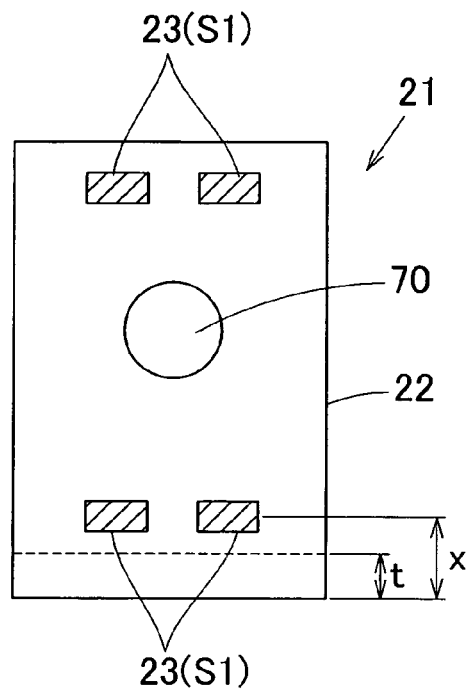
FIG. 4B is a rear view thereof.
Figure 4C:
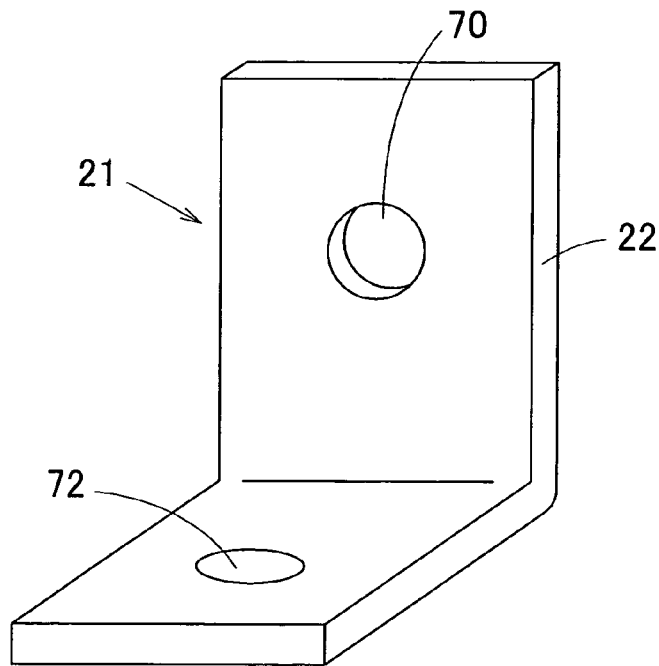
FIG. 4C is a perspective view thereof.

A strain sensor 21 shown in FIGS. 4A to 4C is mounted on an outer peripheral portion of the outer member 1. This strain sensor 21 is of a type including a strain generating member 22, which is fixed to the outer member 1 through a first mounting member 24 and a second mounting member 25, and sensor elements 23 secured to this strain generating member 22 for measuring a strain induced in such strain generating member 22.

The strain generating member 22 includes a first contact fixing segment 22a adapted to be fixed to the flange 1a of the outer member 1 in contact therewith through the first mounting member 24, a second contact fixing segment 22b adapted to be fixed to the peripheral surface of the outer member 1 in contact therewith through the second mounting member 25, and a joint region 22c joining those contact fixing segments 22a and 22b together, which has a bent portion 22e in a generally intermediate portion thereof and convexed toward the outer member 1.

The strain generating member 22 employed in the practice of the first embodiment of the present invention is of a kind made from, for example, a plate material by the use of any known press work and is of an L-shaped configuration including a radial arm 22A extending in its entirety in a radial direction and an axial arm 22B extending in an axial direction. An intermediate portion of the radial arm 22A is rendered to be the first contact fixing segment 22a, while an outboard portion of the axial arm 22B is rendered to be the second contact fixing segment 22b. The joint region 22c is made up of a zone 22ca extending in the radial direction and a zone 22cb extending in the axial direction and represents a shape bent at right angles at an intermediate site. Also, an extension 22d is provided on an outer diametric side of the first contact fixing segment 22a of the radial arm 22A. When the strain generating member 22 is made of a plate material by the use of any known press work, manufacture of the strain generating member 22 can be facilitated and the cost can be reduced.

Two sensor elements 23 are secured to each of the radially oriented zone 22ca of the joint region 22c in the vicinity of the bent portion 22e and to the extension 22d and are juxtaposed relative to each other in a circumferential direction. Those sensor elements 23 are secured to the strain generating member 22 by the use of, for example, a bonding agent.

Figure 6:
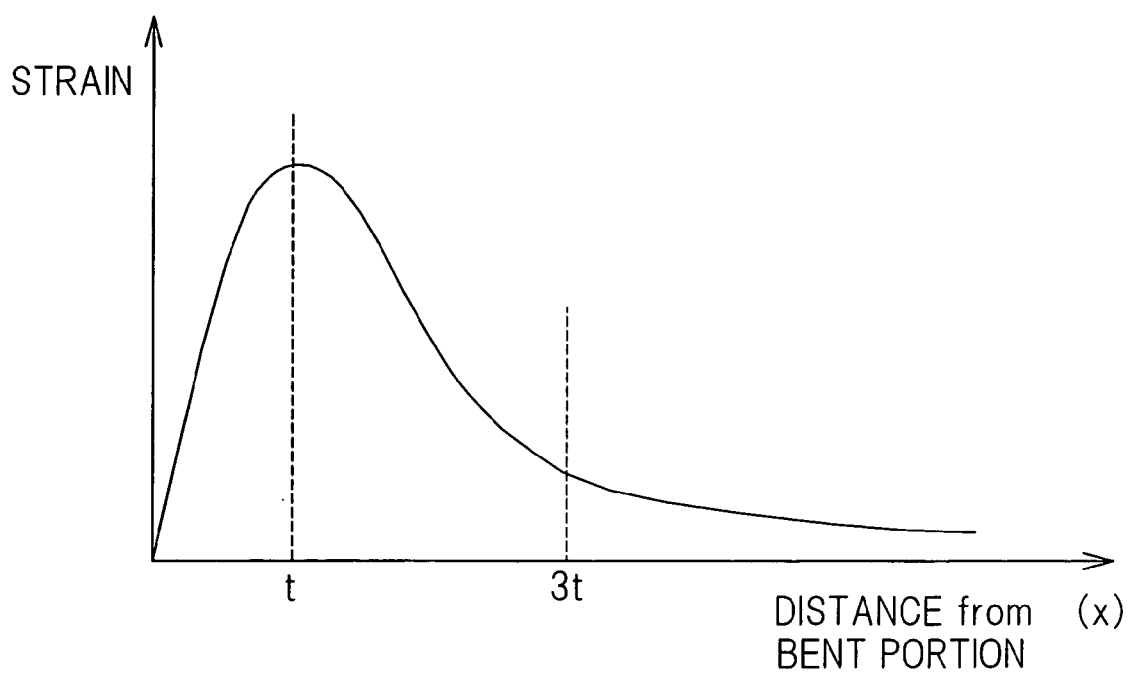
FIG. 6 is a chart showing the relation between the distance from a bent portion of the joint region of the strain generating member and the magnitude of a strain.

The location of the joint region 22c, to which the sensor elements 23(S1) are secured, is preferably chosen to be in the vicinity of the bend portion 22e, where a substantial magnitude of strain occurs in the radially oriented zone 22ca of the joint area 22c. More specifically, such location is so chosen as to lie within three times the wall thickness t of the joint zone 22c from the bent portion 22e of the joint zone 22c towards the first or second contact fixing segment 22a and 22b. In other words, assuming that the distance from the bent portion 22e to the location where the sensor elements 23 are secured is expressed by x, the relationship of x<3t has to be established. The reason therefor is that as shown in the chart of FIG. 6, the magnitude of the strain occurring in the joint zone 22c of the strain generating member 22 is maximum at a position spaced a distance t from the bent portion 22e, and it represents a small value which is unsuitable for the strain measurement, if such position is spaced a distance larger than 3t. In the illustrated embodiment, the sensor elements 23 are arranged at a position spaced from the bent portion 22e towards the first contact fixing segment 22a.

In contrast thereto, the other pair of the sensor elements 23(S2) are secured to a location substantially free from influences of the strain occurring in the outer member 1, which is chosen to be the extension 22d. This extension 22d may extend from the second contact fixing segment 22b in an axially outward direction (towards the outboard side).

Figure 2:
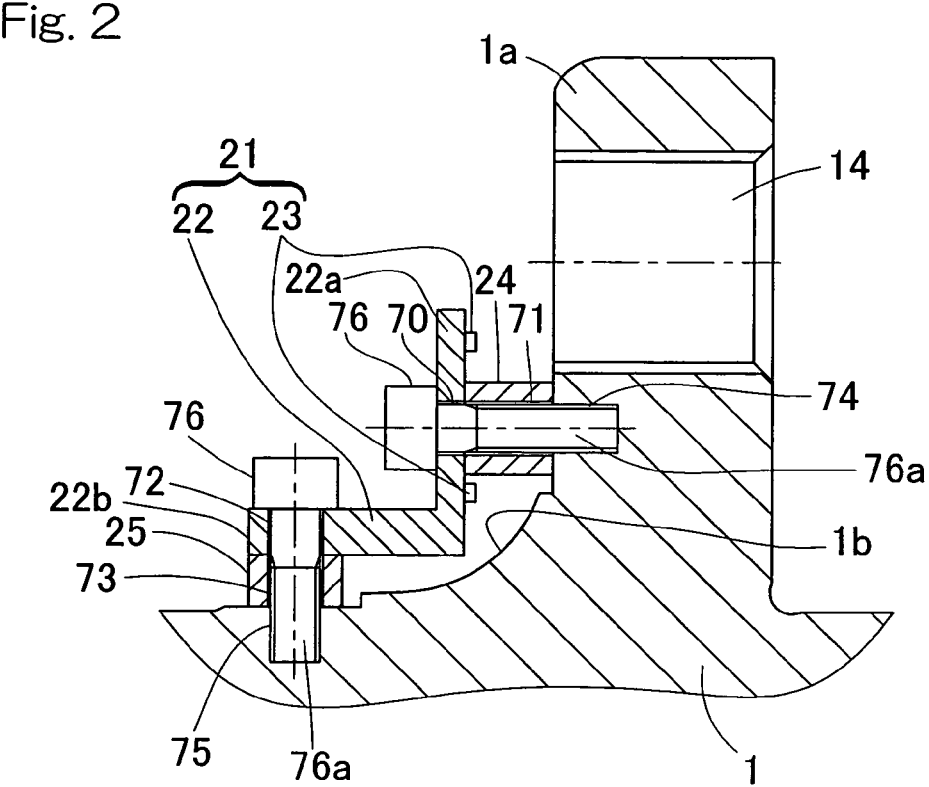
FIG. 2 is a fragmentary enlarged view showing a portion of FIG. 1.
Figure 3:
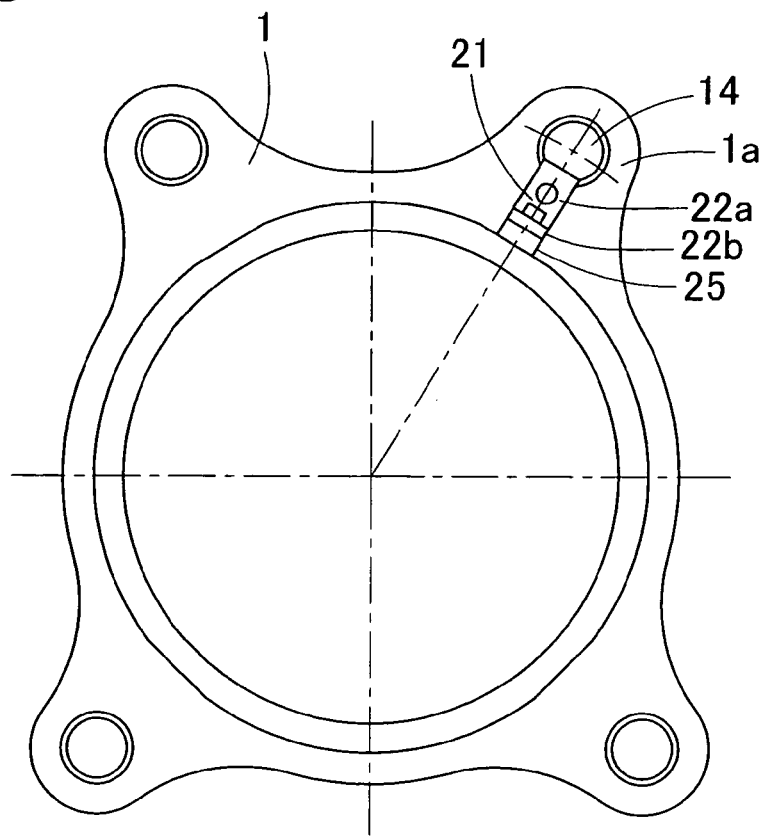
FIG. 3 is a front elevational view showing an outer member and a strain sensor both employed in the sensor equipped wheel support bearing assembly according to the first preferred embodiment of the present invention.

As shown in FIGS. 1 to 3, this strain sensor 21 is of a type secured to the outer member 1 by the use of bolts 76 and, for this purpose, bolt insertion holes 70 and 71 are defined in the first contact fixing segment 22a of the strain generating member 22 and the first mounting member 24 so as to extend axially, respectively, and, on the other hand, bolt insertion holes 72 and 73 are defined in the second contact fixing segment 22b of the strain generating member 22 and the second mounting member 25 so as to extend radially respectively. Also, a bolt threading hole 74 corresponding to the axially extending bolt insertion holes 70 and 71 is defined in an outboard surface of the outer member flange 1a and, on the other hand, a bolt threading hole 75 corresponding to the radially extending bolt insertion holes 72 and 73 is defined in an outer peripheral surface of the outer member 1. The position of the bolt threading hole 74 is in the vicinity of the vehicle body fitting hole 14 in the flange 1a.

The strain sensor 21 is fixed to the outer member 1 by inserting the bolt 76 from the outboard side through the bolt insertion hole 70 in the strain generating member 22 and then through the bolt insertion hole 71 in the first mounting member 24 and subsequently threading a male threaded portion 76a of the bolt 76 into the bolt threading hole 74 in the outer member 1 and, on the other hand, by inserting the bolt 76 from the side of the outer periphery through the bolt insertion hole 72 in the strain generating member 22 and then through the bolt insertion hole 73 in the second mounting member 25 and subsequently threading a male threaded portion 76a of the bolt 76 into the bolt threading hole 75 in the outer member 1.

It is to be noted that fixing of the strain generating member 22 to the first and second mounting members 24 and 25 and fixing of the first and second mounting members 24 and 25 to the outer member 1 may be accomplished by the use of a bonding agent. Also, a bonding agent and bolts may be concurrently used. Furthermore, instead of using any bonding agent or bolts, welding may be employed to accomplish the above described fixings.

Even where any of those fixing techniques is employed, the strain generating member 22 and the first and second mounting members 24 and 25 as well as the first and second mounting members 24 and 25 and the outer member 1 can be firmly fixed together. For this reason, the strain generating member 22 does not displace in position relative to the outer member 1 and deformation of the outer member 1 can be accurately transmitted to the strain generating member 22.

As best shown in FIG. 3, the strain sensor 21 is fixed to an outer peripheral portion of the outer member 1 through the first and second mounting members 24 and 25 so that owning to the first and second contact fixing segments 22a and 22b of the strain generating member 22, those first and second contact fixing segments 22a and 22b can be positioned in the same phase relative to the circumferential direction of the outer member 1. By positioning the first and second contact fixing segments 22a and 22b in the same phase in the circumferential direction, the strain generating member 22 can have a small length and, therefore, the strain sensor 21 can be easily installed.

The strain generating member 22 referred to above is made of such a material and has such a shape that no plastic deformation will occur when it is fixed to the outer member 1. Also, the strain generating member 22 is desired to be of such a shape that it will not plastically deform even when a maximum expected load is applied to the wheel support bearing assembly. The maximum expected force referred to above is a maximum force conceivable during the travel of the automotive vehicle that does not lead to a trouble in the automotive vehicle. That is because once the strain generating member 22 is plastically deformed, deformation of the outer member 1 will not be accurately transmitted to the strain generating member 22, wherefore the measurement of the strain will be affected adversely.

For the sensor elements 23, various types may be employed. By way of example, if the sensor elements 23 are employed in the form of, for example, a metal foil strain gauge, and considering the durability of the metal foil strain gauge, the amount of strain occurring at the sensor element 23 mounting portion of the strain generating member 22 is preferred to be no longer than 1500 microstrain even when the maximum expected load is applied on the wheel support bearing assembly. By a reason similar to that described above, where the sensor elements 23 are in the form of a semiconductor strain gauge, the amount of the strain is preferred to be no longer than 1000 microstrain. On the other hand, where the sensor elements 23 are in the form of a thick film type sensor, the amount of the strain is preferred to be no longer than 1500 microstrain.

Figure 5:
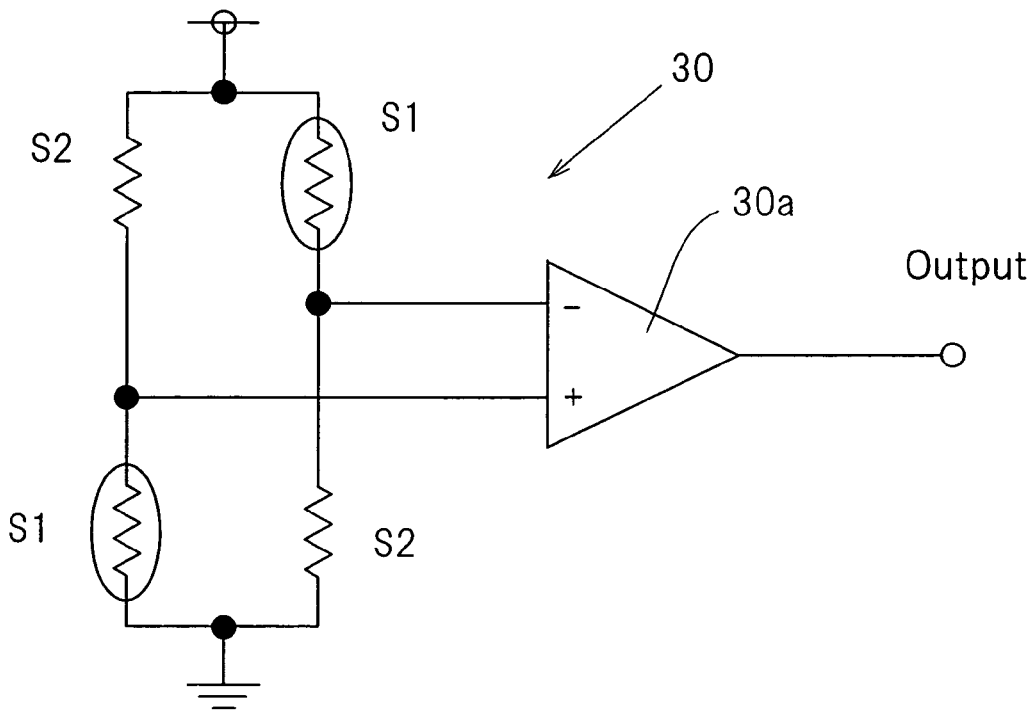
FIG. 5 is a circuit diagram showing an amplifying circuit.

As shown in FIG. 1, for processing outputs of the respective sensor elements 23 of the strain sensor 21, an amplifying circuit 30, an acting force calculator 31 and an abnormality determinator 32 are employed. The amplifying circuit 30 is so designed and so configured that as shown in FIG. 5, the two sensor elements 23(S1) secured to the joint region 22c, where considerable strain induced in the outer member 1 manifests, and the two sensor elements 23(S2) secured to the extension 22d, where little strain induced in the outer member 1 manifests, are connected to form a bridge circuit and an intermediate junction in one of the series connections of one sensor elements S1 and one sensor element S2 and an intermediate junction in the other series connection are connected with an inverting input terminal and a non-inverting input terminal of a differential amplifier 30a, respectively, and is operable to amplify the outputs of the sensor elements 23 (S1) by two-fold. The operations of the acting force calculator 31 and the abnormality determinator 32 will be described in detail later. Those circuit and elements 30, 31 and 32 may be provided on an electronic circuit device (not shown) such as a circuit substrate or the like fitted to the outer member 1 of the wheel support bearing assembly or may be provided in an electric control unit (ECU) of the automotive vehicle.

The operation of the sensor equipped wheel support bearing assembly according to the above-discussed structure will be described hereinafter. When a load is applied to the hub unit 9, the outer member 1 is deformed through the rolling elements 5 and such deformation is transmitted to the strain generating member 22 that is fixed to the outer member 1, resulting in deformation of the strain generating member 22. In response to the strain occurring in this strain generating member 22, the respective sensor elements 23 output. Based on the output from each of those sensor elements 23, the output of the sensor elements 23(S1), which has been amplified by the factor of two, is outputted from the amplifying circuit 30. From this amplified output, the strain imposed on the outer member 1 can be detected.

The radial arm 22A of the strain generating member 22 undergoes deformation in correspondence with deformation of the flange 1a of the outer member 1. Since the strain generating member 22 is of the L-shaped configuration as hereinbefore described, strain concentration occurs in the vicinity of the corner adjacent the radial arm 22A, which lies intermediate between the radial arm 22A and the axial arm 22B, that is, in the vicinity of the bent portion 22e in the radially oriented zone 22ca of the joint region 22c, resulting in occurrence of the strain of a magnitude higher than that in the outer member 1. In other words, the strain occurring in the vicinity of the bent portion 22e in the radially oriented zone 22ca of the joint region 22c represents a transmitted and expanded form of the strain in the R portion 1b at the root portion of the flange 1a. Since the position at which the first contact fixing segment 22a is fitted is chosen to be in the vicinity of the vehicle body fitting hole 14 in the surface of the flange 1a, the difference between the respective radial positions of the first and second contact fixing segments 22a and 22b can be maximized wherever possible and the strain in the outer member 1 can be easily transmitted and expanded in the strain generating member 22.

Since the manner of change of the strain varies depending on the direction and the magnitude of the load, the external force acting on the wheel support bearing assembly or the force acting between the vehicle tire and the road surface can be calculated by determining the relation between the strain and the load beforehand by means of a series of experiments and/or simulations. The acting force calculator 31 referred to previously is operable to calculate the external force acting on the wheel support bearing assembly or the force acting between the vehicle tire and the road surface in reference to the output from the sensor elements 23 by the utilization of the relation between the strain and the load which has been determined by means of the experiments and/or simulations. The abnormality determinator 32 referred to previously is operable to output an abnormality signal to the outside when it determines that the external force acting on the wheel support bearing assembly or the force acting between the vehicle tire and the road surface, which has been calculated by the acting force calculator 31, exceeds a tolerance. This abnormality signal can be used in a vehicle control for the automotive vehicle. Also, if the external force acting on the wheel support bearing assembly or the force acting between the vehicle tire and the road surface is outputted in real time, a meticulous vehicle control can be carried out.

Figure 7:
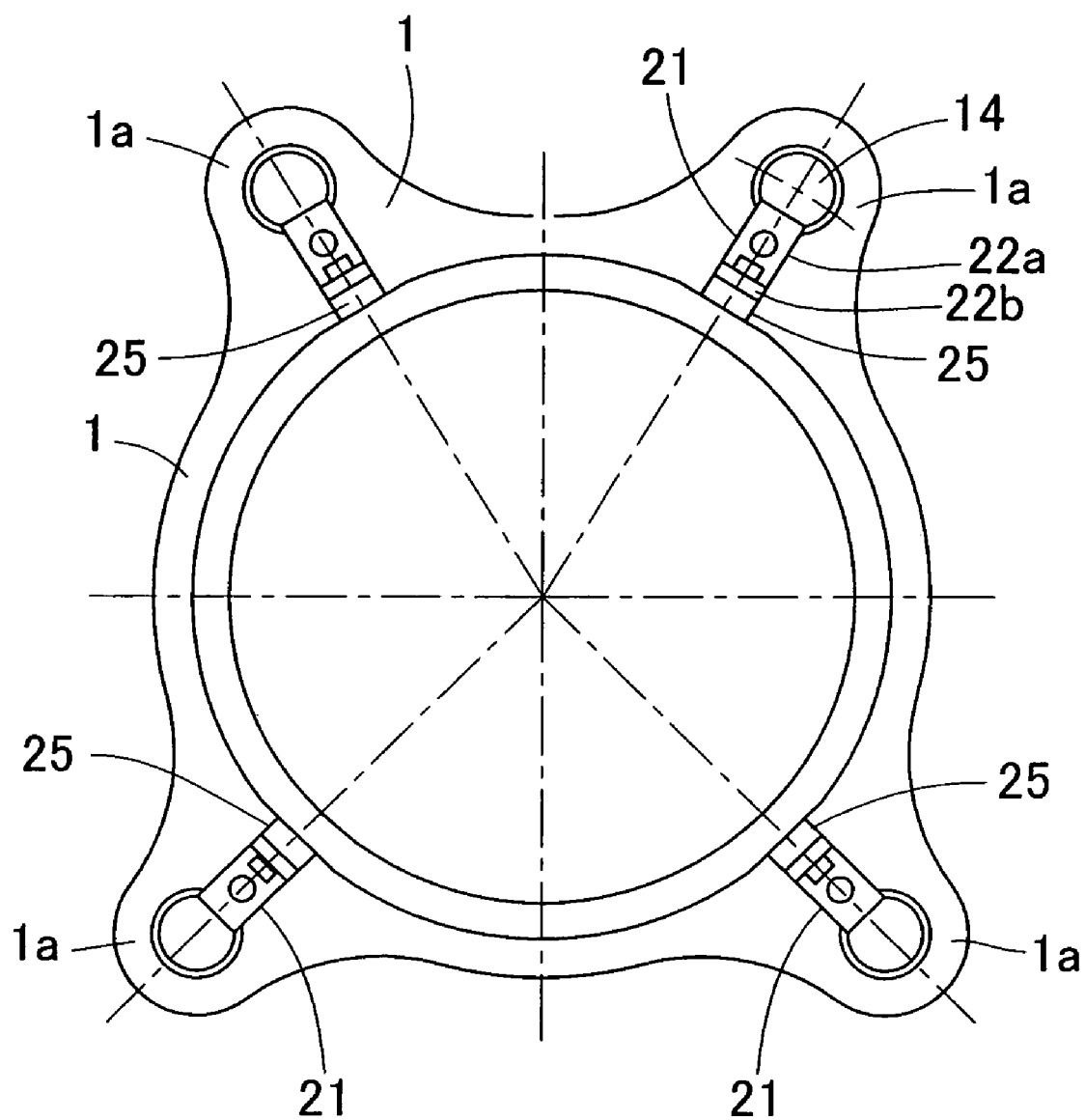
FIG. 7 is a front elevational view showing an outer member and a strain sensor both employed in a sensor equipped wheel support bearing assembly according to a second preferred embodiment of the present invention.
Figure 8:
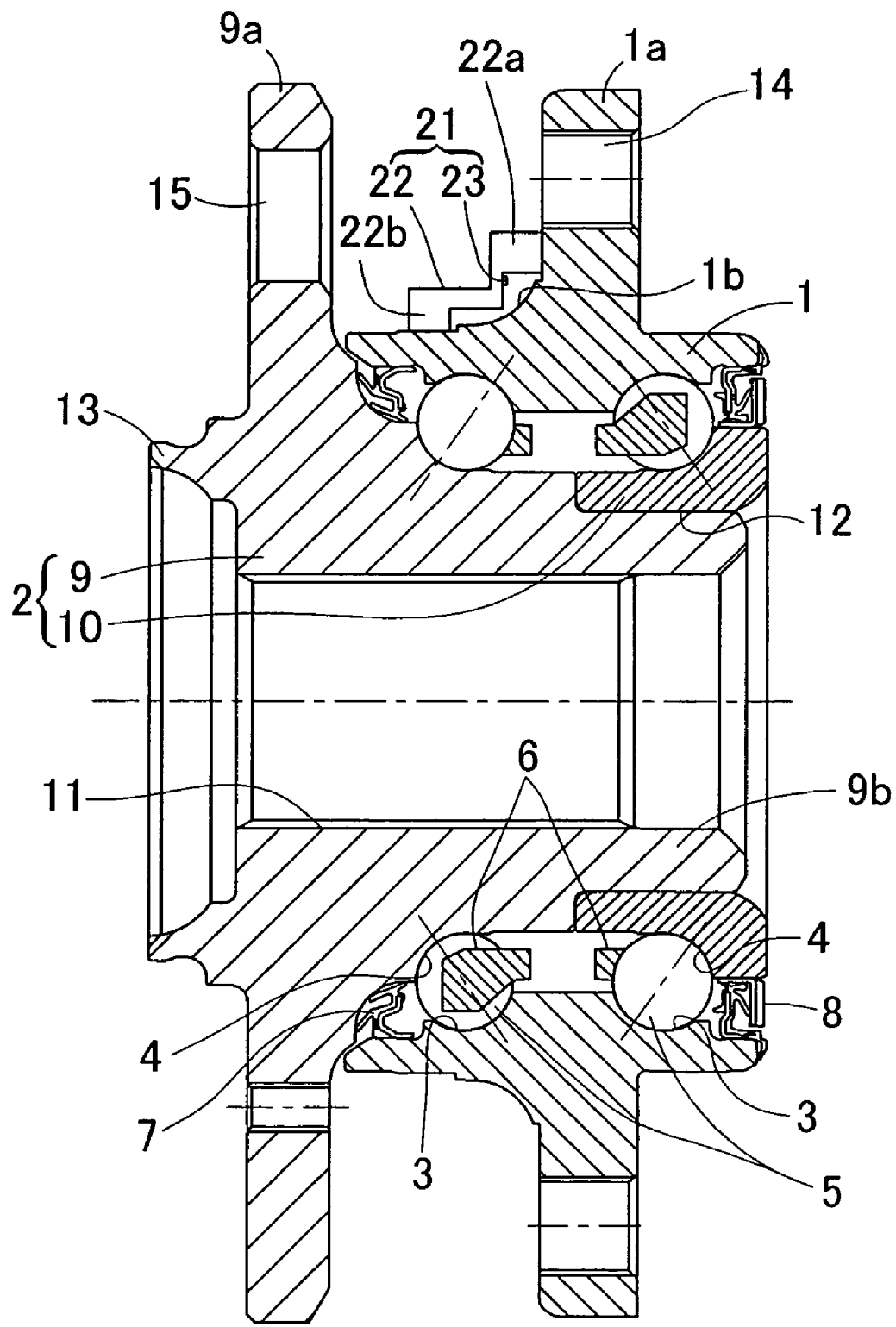
FIG. 8 is a sectional view showing a sensor equipped wheel support bearing assembly according to a third preferred embodiment of the present invention.
Figure 9A:
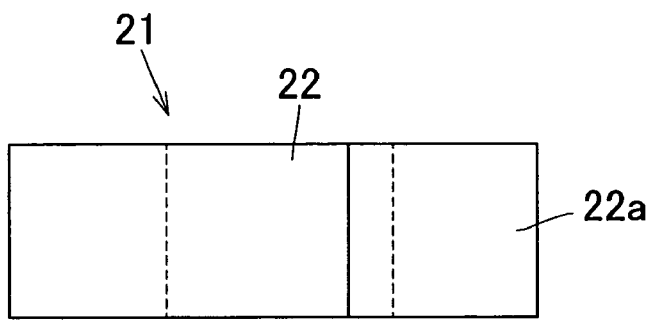
FIG. 9A is a plan view showing the strain sensor employed in the sensor equipped wheel support bearing assembly of FIG. 8.
Figure 9B:
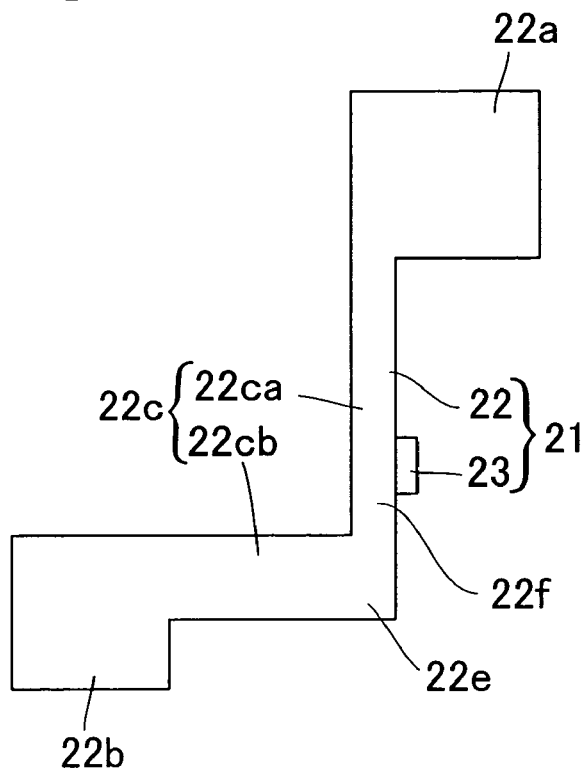
FIG. 9B is a side view thereof.
Figure 9C:
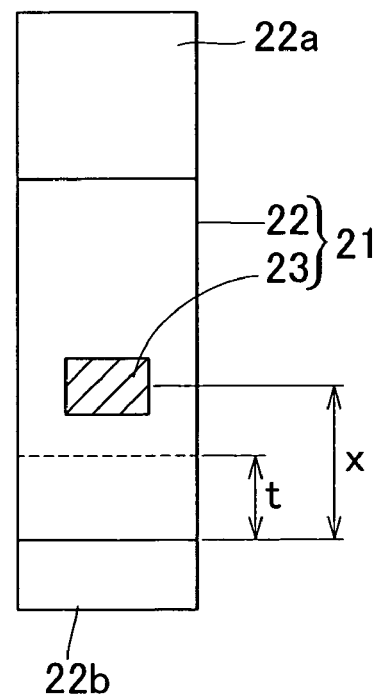
FIG. 9C is a rear view thereof.

Although in the foregoing first embodiment of the present invention the strain sensor 21 has been shown and described as provided at one location in the outer member 1, such a strain sensor 21 may be provided at two or more locations as shown, for example, in a second preferred embodiment of the present invention in FIG. 7. When the strain sensor 21 is provided at two or more locations, a further accurate detection of the load can be accomplished.

FIGS. 8 and 9A to 9C illustrate a third preferred embodiment of the present invention. The strain sensor 21 according to this third embodiment of the present invention is so designed and so configured that the sensor element 23 for measuring the strain of the strain generating member 22 is secured to the strain generating member 22 that is made from a machined product. The strain generating member 22 includes a first contact fixing segment 22a adapted to be fixed adjacent the vehicle body fitting hole 14 in the outer member 1 in contact therewith and a second contact fixing segment 22b adapted to be fixed to the peripheral surface of the outer member 1 in contact therewith, and is fixed directly to the outer member 1 through those contact fixing segments 22a and 22b. In this third embodiment, they are fixedly bonded by the use of a bonding agent.

The strain generating member 22 is of a design in which the joint region 22c joining the first contact fixing segment 22a and the second contact fixing segment 22b together is so structured as to assume a substantially L-shaped configuration having a radially oriented zone 22ca and an axially oriented zone 22cb. The radially oriented zone 22ca has a wall thickness small enough to reduce the rigidity thereof as compared with that of the axially oriented zone 22cb. One sensor element 23 is secured to a portion of the radially oriented zone 22ca of the joint region 22c adjacent the bent portion 22e. The location to which the sensor element 23 is secured is so chosen, in a manner similar to the first embodiment, as to lie within three times the wall thickness t of the axially oriented zone 22cb of the joint region 22c from the bent portion 22e of the joint zone 22c (x<3t).

Structural features other than those described above are similar to those in the first embodiment. Like parts are designated by like reference numerals.

Even in the case of the third embodiment of the present invention, the strain induced in the outer member 1 is transmitted to the strain generating member 22 and the sensor element outputs in response to the strain transmitted to the strain generating member 22. In this process, the radially oriented zone 22ca of the joint region 22c deforms according to deformation of the flange 1a in the outer member 1. Since the joint region 22c of the strain generating member 22 is low in rigidity at the radially oriented zone 22ca and since the joint region 22c is so structured as to represent the L-shaped configuration with the radially oriented zone 22ca having the low rigidity and the axially oriented zone 22cb having a high rigidity, strain tend to concentrate in a portion of the radially oriented zone 22ca adjacent the bent portion 22e, that is, where the sensor element 23 is secured, resulting in appearance of the strain of a magnitude higher than that in the outer member 1. In other words, the strain at the location where the sensor element 23 is secured represents a transmitted and expanded form of the strain in the R portion 1b at the root portion of the flange 1a. Since the sensor element 23 outputs in response to this strain, the strain induced in the outer member 1 can be detected with high sensitivity, resulting in increase of the measuring accuracy.

Even in the strain generating member 22 employed in the practice of the third embodiment of the present invention and made from the machined product, in a manner similar to the first embodiment, such a sensor element 23 may be secured at a plurality of circumferential locations of the joint region 22c. Also, separate from the sensor element 23 at the joint region 22c, a sensor element 23 may be secured to a portion of the outer member 1 which is substantially free from influence brought about by the strain, for example, the first contact fixing segment 22a so that from the outputs of those sensor elements 23, the output from the sensor element 23 at the joint region 22c can be amplified.

Since the strain sensor 21 employed in the practice of the third embodiment is made from the machined product, the wall thickness of each of the radial arm 22A and the axial arm 22B can be changed easily and, accordingly, the strain can be further concentrated on a peripheral area of the location at which the sensor element 23 is secured, to thereby allow the further increased strain to be generated.

Although in any one of the foregoing first to third embodiments, the joint region 22c of the strain generating member 22 is of the L-shaped configuration having the radially oriented zone 22ca and the axially oriented zone 22cb, the joint region of the strain generating member need not necessarily be of the L-shaped configuration, provided that the bent portion be convexed toward the outer member 1. Even in such case, a portion of the joint region where the element sensor is secured is chosen to be on the first contact fixing segment side with respect to the bent portion of the joint region and yet in the vicinity of the bent portion.

A fourth preferred embodiment of the present invention will be described hereinafter with particular reference to FIGS. 10 to 13C. In FIGS. 10 to 13C, component parts similar to those shown in FIGS. 1 to 4C and employed in the practice of the first embodiment are designated by like reference numerals employed in FIGS. 1 to 4C and the details thereof are not reiterated for the sake of brevity.

The strain generating member 22 is so structured as to represent an L-shaped configuration having a radially extending radial arm 22A and an axially extending axial arm 22B, and a free end portion of the radial arm 22A is rendered to be the first contact fixing segment 22a that is fixed to the first mounting member 24 in contact therewith and a free end portion of the axial arm 22B is rendered to be the second contact fixing segment 22b that is fixed to the second mounting member 25 in contact therewith, but circumferentially opposite side portions of the radial arm 22A are formed with respective cutouts 22h recessed circumferentially inwardly at a position adjacent a point of intersection between the radial arm 22A and the axial arm 22B. Two sensor elements 23 are secured, in a circumferentially juxtaposed relation to each other, to an area constricted inwardly in the presence of the cutouts 22h. In other words, the peripheral region 22f of the location in the strain generating member 22 where the sensor elements 23 are secured has a locally reduced width. The sensor elements 23 are secured to the strain generating member 22 by the use of, for example, a bonding agent. Also, the strain generating member 22 employed in the practice of the fourth embodiment is made from a plate material that is shaped by a press work. When the strain generating member 22 is formed by the use of, for example, a press work applied to the plate material, manufacture of the strain generating member 22 can be facilitated and the cost can also be reduced. Although the peripheral region 22f referred to above is described as positioned in the vicinity of the bent portion 22e, it may not be in the vicinity thereof since its reduced width can bring about a considerable strain.

Figure 10:
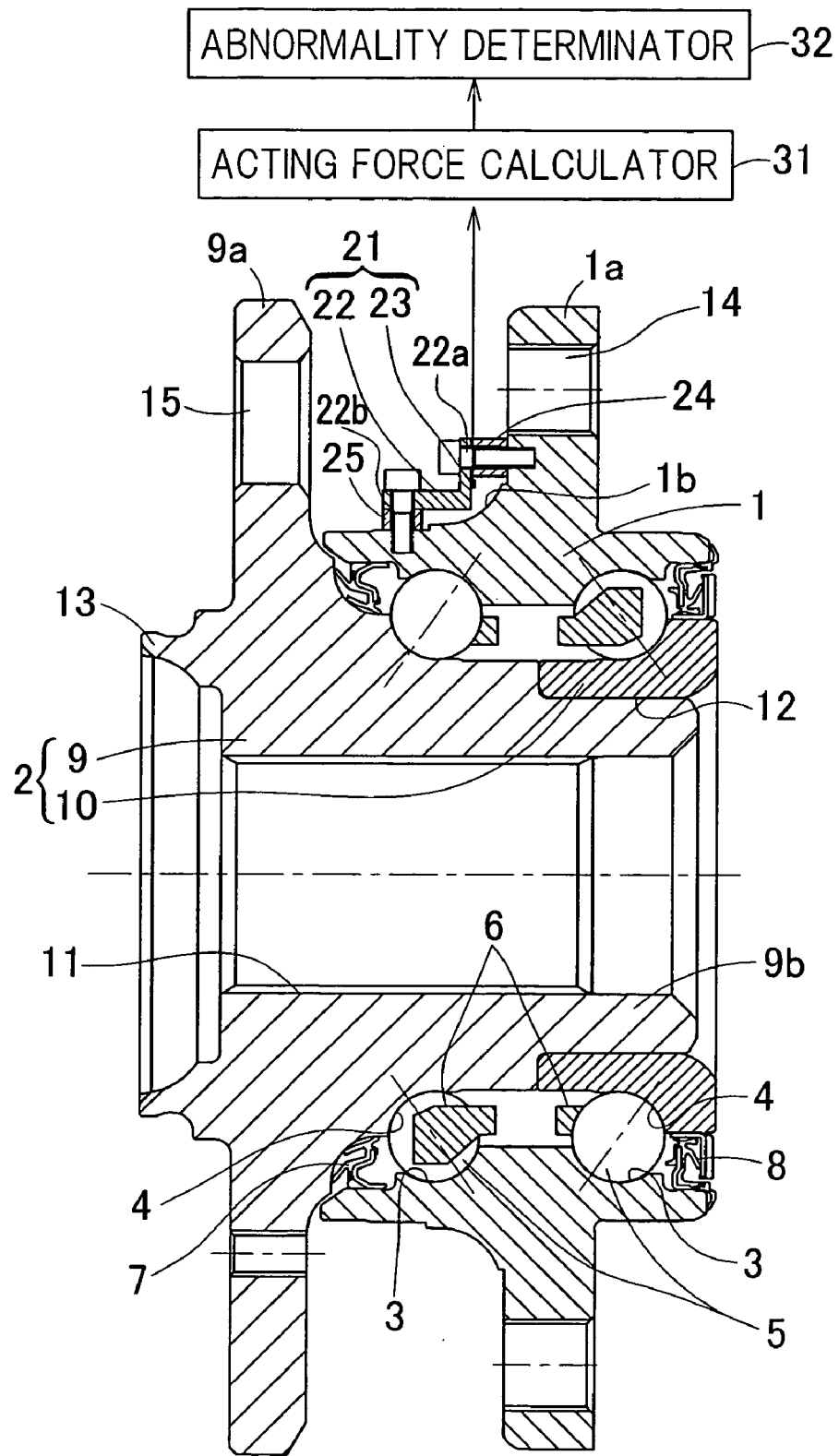
FIG. 10 shows a sectional view of a sensor equipped wheel support bearing assembly according to a fourth preferred embodiment of the present invention, and also a block diagram illustrating the concept of a detecting system therefor.
Figure 11:
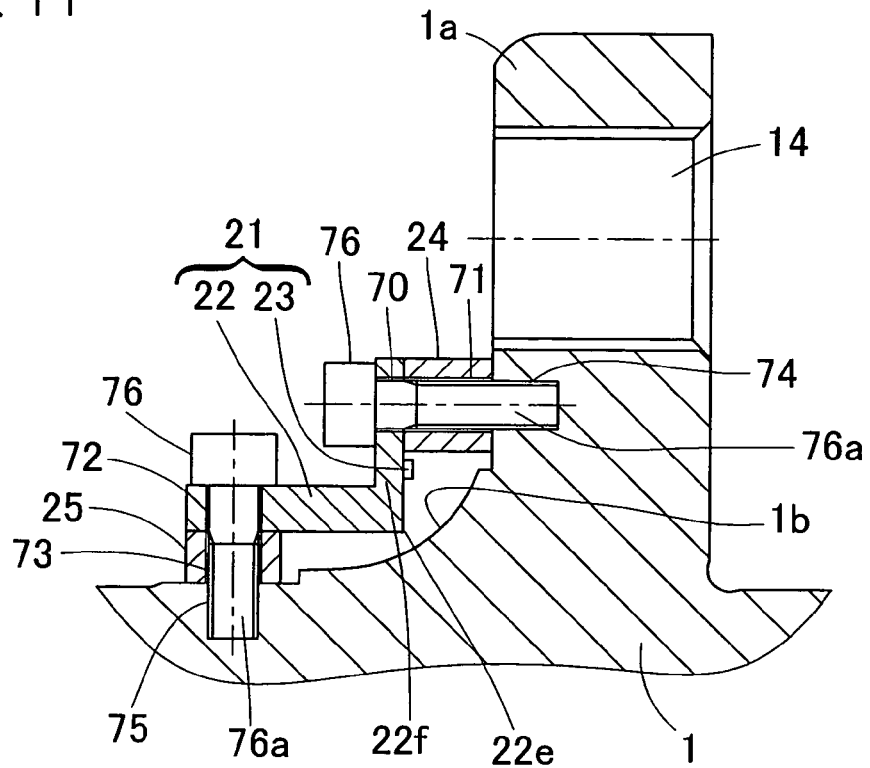
FIG. 11 is a fragmentary enlarged view showing a portion of FIG. 10.
Figure 12:
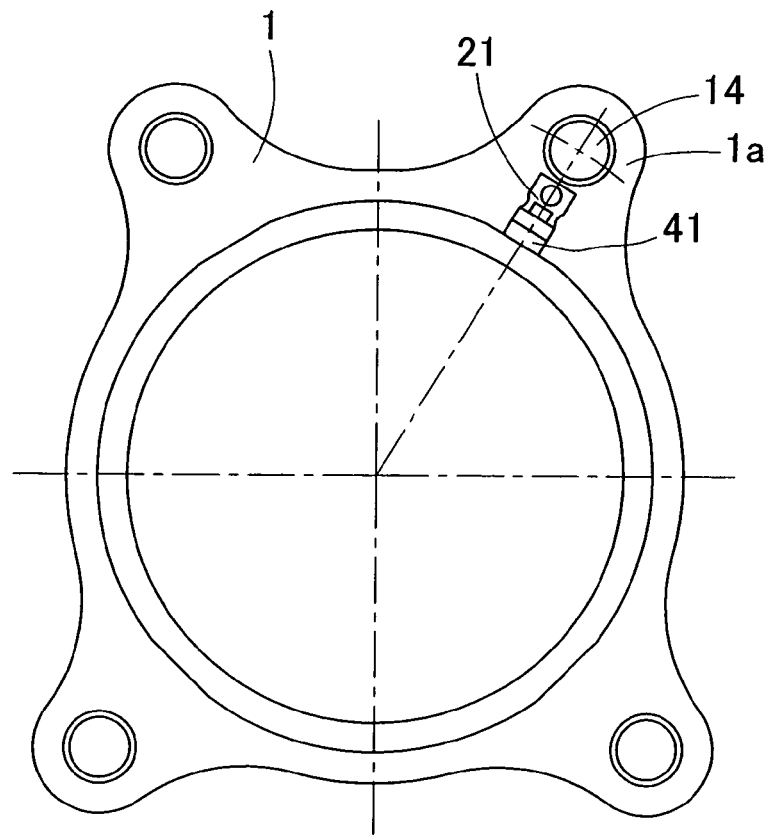
FIG. 12 is a front elevational view showing an outer member and a strain sensor both employed in the sensor equipped wheel support bearing assembly of FIG. 10.

As best shown in FIGS. 10 and 11, securing of the strain sensor 21 to the outer member, fixing of the strain generating member 22 and the first and second mounting members 24 and 25 together and fixing of the first and second mounting members 24 and 25 and the outer member 1 together are all similar to those shown in and described with reference to FIGS. 1 to 4C in connection with the previously described first embodiment.

As shown in FIG. 10, for processing the output from the sensor elements 23 of the strain sensor 1, an acting force calculator 31 and an abnormality determinator 32 are provided. If required, an amplifying circuit may be provided before the acting force calculator 31.

The operation of the sensor equipped wheel support bearing assembly of the structure hereinabove described will be described subsequently. Although it is basically similar to that in the previously described first embodiment, particularly in the case of this fourth embodiment the peripheral region 22f of the location where the sensor elements 23 are secured, represents a shape having a locally reduced width and, accordingly, in the strain generating member 22, particularly considerable strains are induced there. Since the sensor elements 23 outputs in response to this strain, the strain induced in the outer member 1 can be detected with high sensitivity and the strain measuring accuracy can be increased accordingly.

Since the strain sensor 21 employed in the practice of the above described fourth embodiment makes use of the two sensor elements 23 secured to the strain generating member 22, the use of a mean value of the respective outputs from those sensor elements 23 makes it possible to detect the load with high accuracy. The number of the sensor elements 23 may be one or three or more.

Figure 14A:
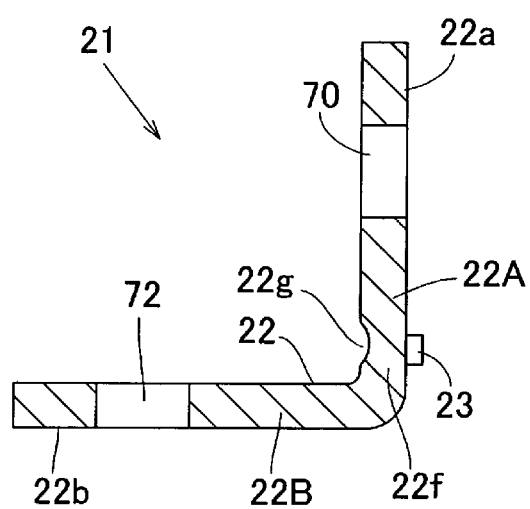
FIG. 14A is a side view showing a strain sensor employed in a sensor equipped wheel support bearing assembly according to a fifth preferred embodiment of the present invention.
Figure 14B:
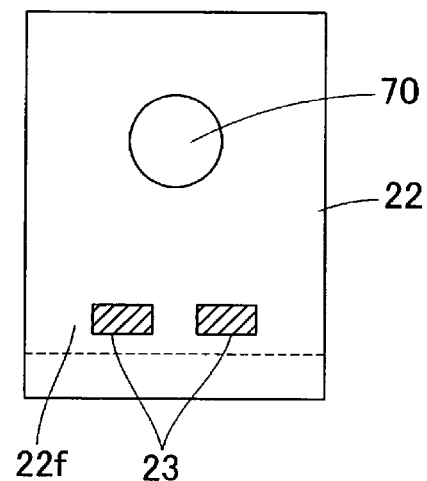
FIG. 14B is a rear view showing a strain sensor employed in a sensor equipped wheel support bearing assembly according to the fifth preferred embodiment of the present invention.
Figure 14C:
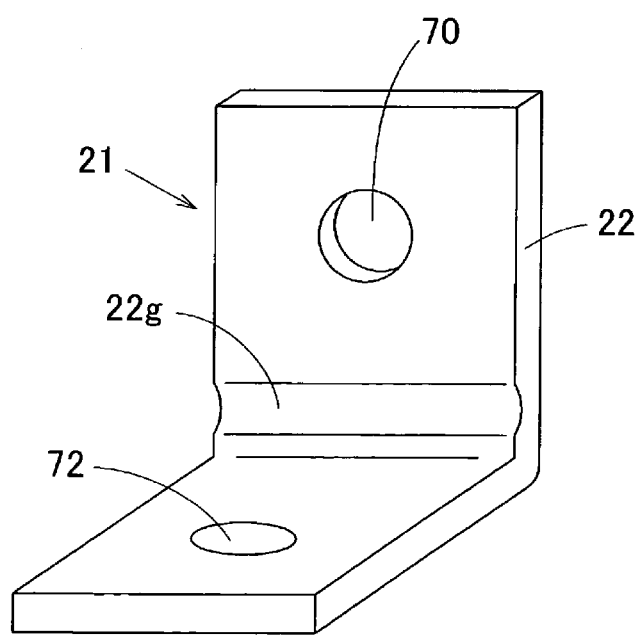
FIG. 14C is a perspective view showing a strain sensor employed in a sensor equipped wheel support bearing assembly according to the fifth preferred embodiment of the present invention.
Figure 17A:
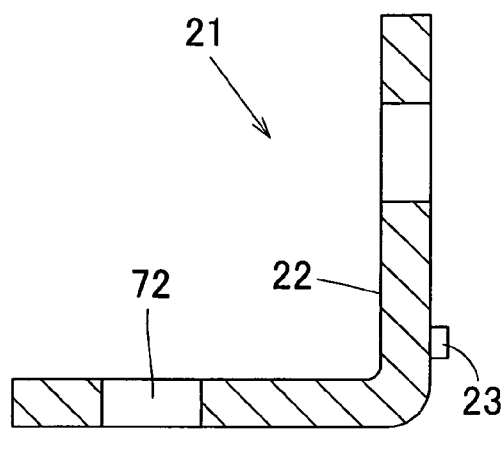
FIG. 17A is a side view showing a strain sensor for comparison purpose.
Figure 17B:
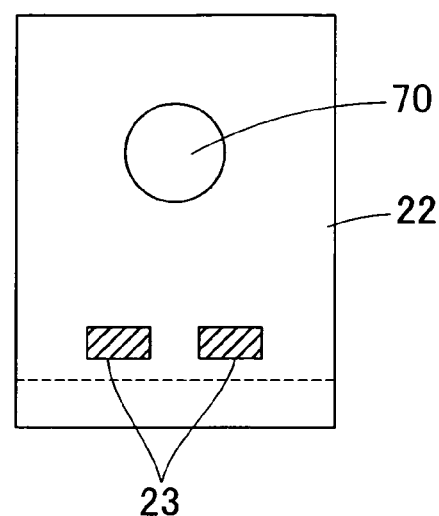
FIG. 17B is a rear view showing a strain sensor for comparison purpose.
Figure 17C:
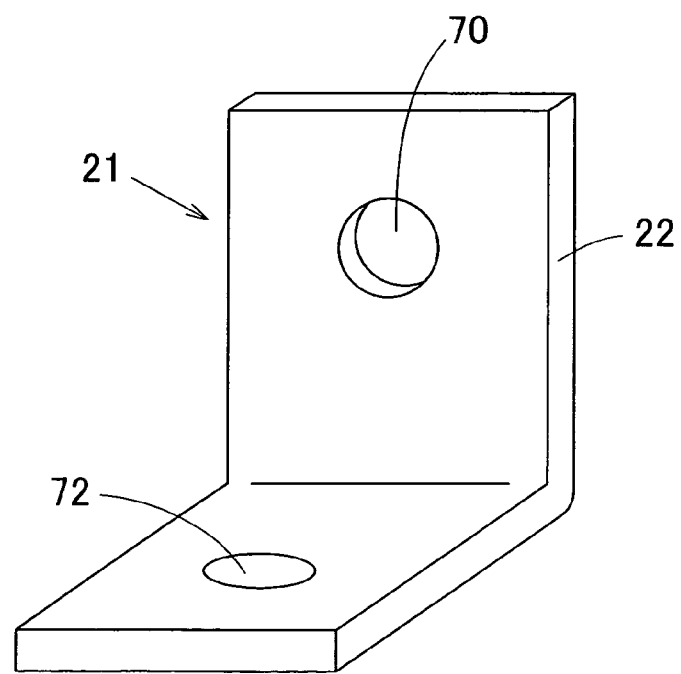
FIG. 17C is a perspective view showing a strain sensor for comparison purpose.

Although the strain sensor 21 according to this fourth embodiment of the present invention is so designed that the peripheral region 22f of the location in the strain generating member 22 where the sensor elements 23 are secured is locally reduced in width so that the strain can occur particularly considerably at such locations where the sensor elements 23 are secured, the use may be made of a groove 22g or the like, such as in a fifth preferred embodiment of the present invention shown in FIGS. 14A to 14C, to locally reduce the wall thickness of the peripheral region 22f of the location in the strain generating member 22 where the sensor elements 23 are secured, so that the strain can occur particularly considerably at such location where the sensor elements 23 are secured. The peripheral region 22f of the location in the strain generating member 22 where the sensor elements 23 are secured may have a locally reduced wall thickness along with a locally reduced width. In either case, as compared with the strain generating member 22 having a constant width and a constant wall thickness as shown in FIGS. 17A to 17C illustrating a comparison, it is possible to allow considerable strain to occur.

Figure 15:
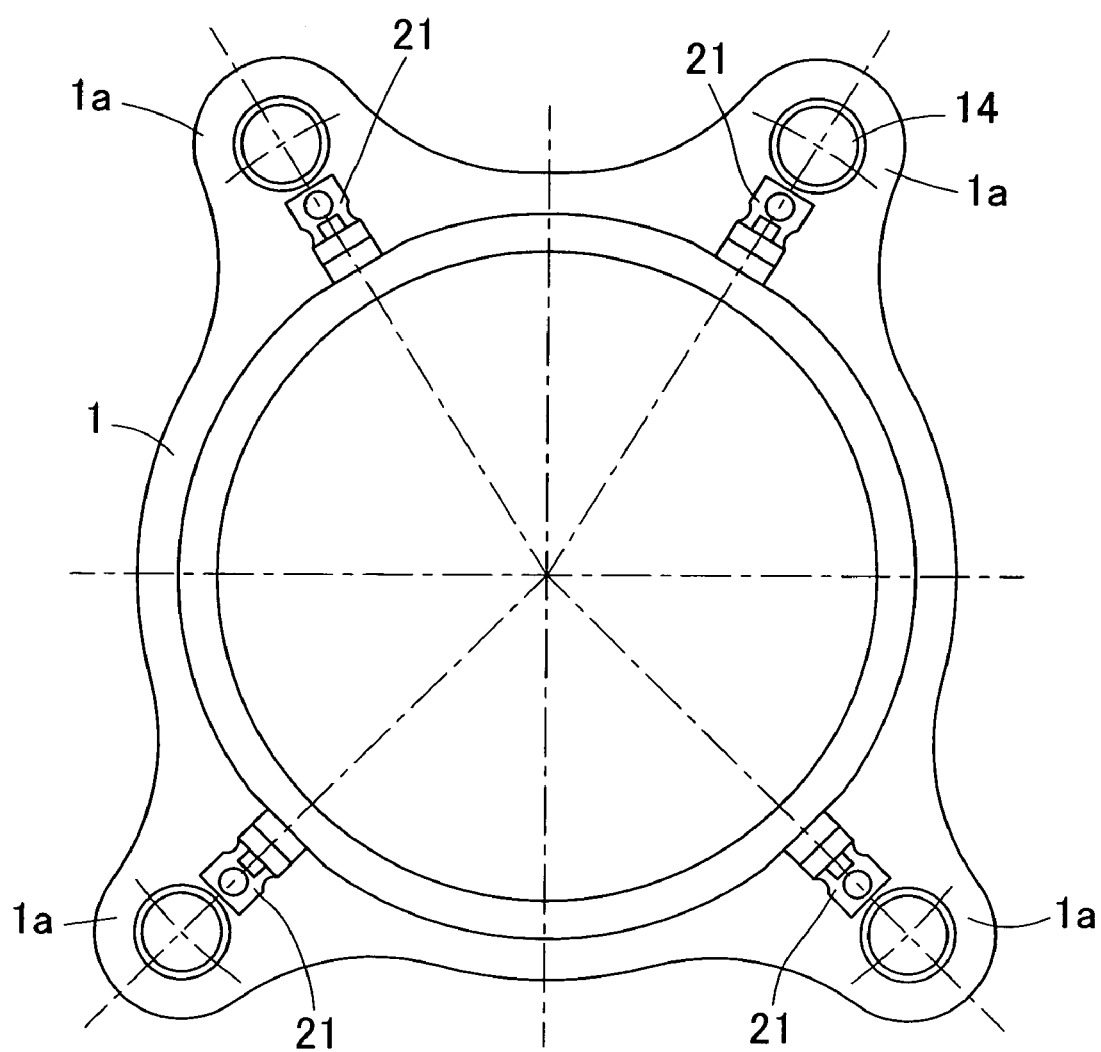
FIG. 15 is a front elevational view showing an outer member and a strain sensor both employed in a sensor equipped wheel support bearing assembly according to a sixth preferred embodiment of the present invention.

Also, in this fourth embodiment, the strain sensor 21 has been shown and described as provided at one location in the outer member 1, but in a manner similar to that in the second embodiment shown in FIG. 7, such a strain sensor 21 may be provided at two or more locations such as, for example, in a sixth preferred embodiment of the present invention shown in FIG. 15. Where the strain sensor 21 is provided at two or more locations, the detection of the load can be accomplished with further high accuracy.

Figure 16A:
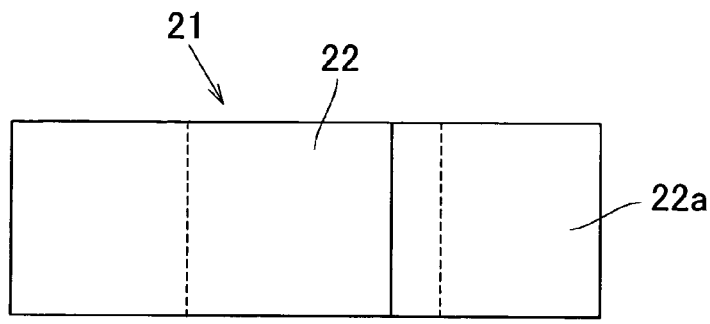
FIG. 16A is a plan view showing a strain sensor employed in a sensor equipped wheel support bearing assembly according to a seventh preferred embodiment of the present invention.
Figure 16B:
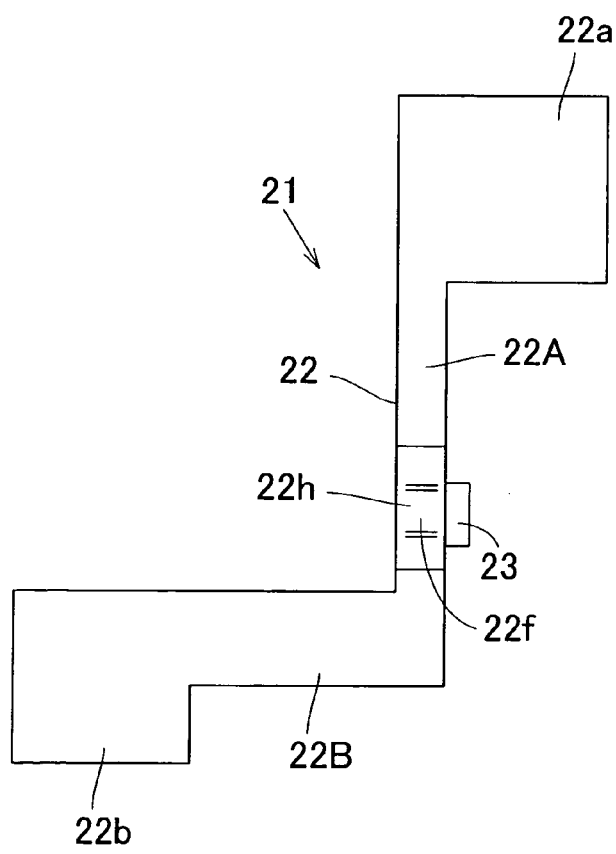
FIG. 16B is a side view showing a strain sensor employed in a sensor equipped wheel support bearing assembly according to the seventh preferred embodiment of the present invention.
Figure 16C:
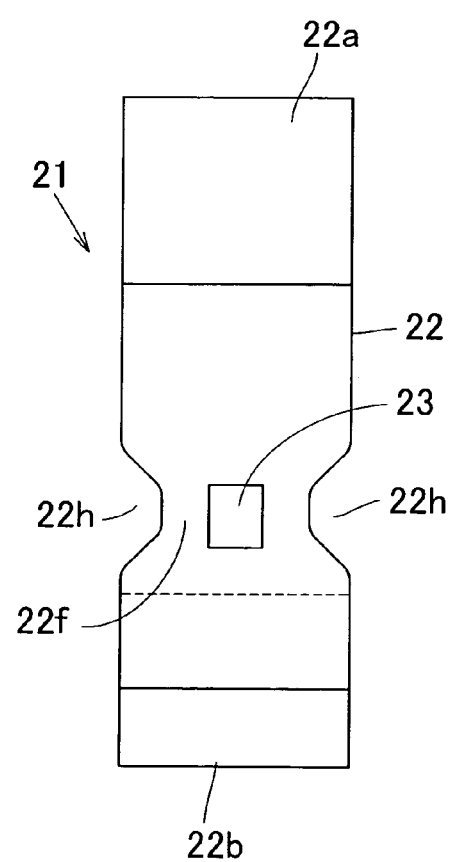
FIG. 16C is a rear view showing a strain sensor employed in a sensor equipped wheel support bearing assembly according to the seventh preferred embodiment of the present invention.

FIGS. 16A to 16C illustrate a seventh preferred embodiment of the present invention. The strain sensor 21 employed in the practice of this seventh embodiment is such that in a manner similar to that in the previously described third embodiment shown in FIGS. 9A to 9C, the strain generating member 22, made from a machined product, has a sensor element 23 secured thereto for the measurement of the strain induced in the strain generating member 22.

The strain generating member 22 is of an L-shaped configuration having a radially oriented radial arm 22A, inclusive of the previously described first contact fixing segment 22a, and an axially oriented axial arm 22B inclusive of the previously described second contact fixing segment 22b. The radial arm 22A has a wall reduced in thickness to reduce the rigidity as compared with that of the axial arm 22B. Also, circumferentially opposite side portions of the radial arm 22A are formed with respective cutouts 22h recessed circumferentially inwardly at a position adjacent a point of intersection between the radial arm 22A and the axial arm 22B. One sensor element 23 is secured to an area constricted inwardly in the presence of the cutouts 22h. In other words, the peripheral region 22f of the location in the strain generating member 22 where the sensor element 23 is secured has a locally reduced width.

Structural features other than those described above are similar to those in the previously described embodiment. Like parts are designated by like reference numerals.

Even in this seventh embodiment, since as is the case with the previously described fourth embodiment, the peripheral region 22f of the location where the sensor element 23 is secured is of a configuration having a locally reduced width, the particularly considerable strain in the strain generating member 22 occurs at that location. Since the sensor element 23 outputs in response to this strain, the strain induced in the outer member 1 can be detected with high sensitivity and the strain measuring accuracy can be increased.

The strain generating member 22 may be a sintered metal product formed by the use of a metal powder injection molding technique. The metal powder injection molding is one of the molding techniques for metal, intermetallic compounds or the like and includes a step of kneading a metallic powder with a binder, a step of injection molding with the use of this kneaded material, a step of degreasing the resultant molded article, and a step of sintering the molded article. According to this metal powder injection molding, there are such advantages that a sintered body having a high sintering density as compared with the standard powder metallurgy can be obtained, a sintered metallic product can be manufactured with high dimensional accuracy, and the mechanical strength is high.

In any one of the foregoing embodiments of the present invention, the outer member 1 has been shown and described as being the stationary member, but the present invention can be equally applied to a wheel support bearing assembly, in which the inner member serves as the stationary member, in which case a strain sensor 21 is to be provided on an inner periphery of the inner member.

Also, although in any one of the foregoing embodiments of the present invention, the present invention has been shown and described as applied to the wheel support bearing assembly of the third generation type, the present invention can be equally applied to a wheel support bearing assembly of the first or second generation type, in which a bearing unit and a hub are component parts separate from each other, and also to a wheel support bearing assembly of the fourth generation type, in which a part of the inner member is formed by an outer ring of the constant velocity universal joint. In addition, this sensor equipped wheel support bearing assembly can be applied to a wheel support bearing assembly for the support of a vehicle driven wheel and also to a wheel support bearing assembly of a tapered roller type of any of the various generation types.

In any one of the foregoing embodiments of the present invention described hereinbefore, it is a requirement that the sensor element or sensor elements be secured in the vicinity of the bent portion of the strain generating member, but the following mode of modification can be contemplated, which does not require this arrangement.

[Mode of Modification]

This mode of modification is such that in a sensor equipped wheel support bearing assembly for rotatably supporting a vehicle wheel relative to a vehicle body structure, which comprises an outer member having an inner periphery formed with a plurality of rows of rolling surfaces, an inner member having rolling surfaces formed therein in face-to-face relation with the rolling surfaces in the outer member, a plurality of rows of rolling elements interposed between those opposed rolling surfaces, and a sealing element sealing an end space between the outer member and the inner member; and a strain sensor unit made up of a strain generating member fixed to one of the outer and inner members, that serves as a stationary member, and a sensor element for measuring a strain secured to the strain generating member;

wherein the strain generating member has first and second contact fixing segments each provided at different two locations; the first contact fixing segment is associated with a flange surface provided in the stationary member; the second contact fixing segment is associated with a peripheral surface of the stationary member; and a peripheral area of a location to which the sensor element is secured has a locally reduced width or a locally reduced thickness.

When a load acts on the rotating member as a result of travel of the automotive vehicle, the stationary member is deformed through the rolling elements and such deformation brings about strain in the strain generating member. The sensor element secured to the strain generating member outputs in response to the strain induced in the strain generating member. From this output, the strain in the stationary member can be detected. If the relation between the strain and the load is determined beforehand by means of a series of experiments and/or simulations, the load acting on the vehicle wheel can be detected from the output of the sensor element. Also, the load so detected can be used in vehicle control of the automotive vehicle.

Since the wheel support bearing assembly of the structure described above is so designed that the sensor unit including the strain generating member and the sensor element secured to the strain generating member is fixed to the stationary member, the sensor for the detection of the load can be installed compactly. Also, since the strain generating member is a simple component part easy to fit to the stationary member, attaching the sensor element makes the sensor unit excellent in mass-production and allows the cost to be reduced.

Since the strain generating member has the contact fixing segment at two locations, since the first contact fixing segment is associated with a flange surface provided in the stationary member, and since the second contact fixing segment is associated with a peripheral surface of the stationary member, respective radial positions of the first and second contact fixing segments are different from each other and, hence, a transmitted and expanded form of strain in the stationary member occurs readily in the strain generating member. Because the sensor element outputs according to the strain so transmitted and expanded, the strain in the stationary member can be detected with high sensitivity, resulting in increase of the load measuring accuracy.

Also, since the peripheral area of the location where the sensor element is secured is of a shape having a locally reduced width or a locally reduced thickness, the strain can show up considerably in the peripheral area of the location in the strain generating member where the sensor element is secured. For this reason, the strain occurring in the stationary member can be detected with even higher sensitivity.

In the foregoing mode of modification, the stationary member may be, for example, the outer member. In such case, the strain sensor is fixed to an outer peripheral surface of the outer member. Also, it is desirable that the strain generating member be of a structure having an L-shaped configuration defined by a radially oriented radial arm and an axially oriented axial arm, and the sensor element be fitted to a portion of the radial arm in the vicinity of the point of intersection with the axial arm.

The strain generating member referred to above may be a press finished product of a plate material, a machined product or a sintered metal produced by a metal powder injection molding.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor equipped wheel support bearing assembly for rotatably supporting a vehicle wheel relative to a vehicle body structure, comprising:
    an outer member having an inner periphery formed with a plurality of rolling surfaces;
    an inner member having rolling surfaces formed therein in face-to-face relation with the rolling surfaces in the outer member;
    a plurality of rows of rolling elements interposed between those opposed rolling surfaces; and
    a strain sensor unit including a strain generating member fixed to one of the outer and inner members, that serves as a stationary member, and a plurality of sensor elements arranged on the strain generating member juxtaposed relative to each other in a circumferential direction to measure a strain secured to the strain generating member,
    wherein the strain generating member includes a first contact fixing segment associated with a flanged face provided in the stationary member, a second contact fixing segment associated with a peripheral surface of the stationary member, and a joint region defined between the first and second contact fixing segments having a bent portion that is bent at an intermediate site thereof and convexed toward the stationary member, and
    the plurality of sensor elements are disposed so that an equal number of sensor elements are disposed in the vicinity of the bent portion in the joint region as are disposed to one of the contact fixing segments of the strain generating member or to an extension extending from one of the contact fixing segments in a direction counter to the joint region.

2. The sensor equipped wheel support bearing assembly as claimed in claim 1, wherein the stationary member is the outer member.

3. The sensor equipped wheel support bearing assembly as claimed in claim 2, wherein the joint region of the strain generating member is of an L-shaped configuration having a radially oriented zone and an axially oriented zone.

4. The sensor equipped wheel support bearing assembly as claimed in claim 3, wherein the location in the strain generating member to which the sensor elements disposed in the vicinity of the bent portion in the joint region are positioned within three times the wall thickness of the joint region from the bent portion of the joint region towards one of the first and second contact fixing segments.

5. The sensor equipped wheel support bearing assembly as claimed in claim 1, further comprising:
    an amplifying circuit to amplify output of the sensor elements at the joint region based on respective outputs of the sensor elements at the joint region and the extension so as to output a new signal.

6. The sensor equipped wheel support bearing assembly as claimed in claim 1, wherein the strain generating member comprises a press finished product of a plate material.

7. The sensor equipped wheel support bearing assembly as claimed in claim 1, wherein the strain generating member comprises a machined product.

8. The sensor equipped wheel support bearing assembly as claimed in claim 1, wherein the strain generating member comprises a sintered metal made by means of a metal powder injection molding technique.

9. A sensor equipped wheel support bearing assembly to rotatably support a vehicle wheel relative to a vehicle body structure, comprising:
- an outer member having an inner periphery formed with a plurality of rolling surfaces;
- an inner member having rolling surfaces formed therein in face-to-face relation with the rolling surfaces in the outer member;
- a plurality of rows of rolling elements interposed between those opposed rolling surfaces; and
- a strain sensor unit including a strain generating member fixed to one of the outer and inner members, that serves as a stationary member, and a sensor element to measure a strain secured to the strain generating member, wherein the strain generating member includes a first contact fixing segment associated with a flanged face provided in the stationary member, a second contact fixing segment associated with a peripheral surface of the stationary member, and a joint region defined between the first and second contact fixing segments having a bent portion that is bent at an intermediate site thereof and convexed toward the stationary member, wherein a location in the strain generating member, to which the sensor element is secured, is in the vicinity of the bent portion in the joint region, and wherein a peripheral area of the location in the strain generating member to which the sensor element is secured is of a shape having a locally reduced width.

* * * * *